Jan. 6, 1959   H. D. STECHER   2,867,680
SPLICE BOX
Filed Feb. 9, 1955   2 Sheets-Sheet 1
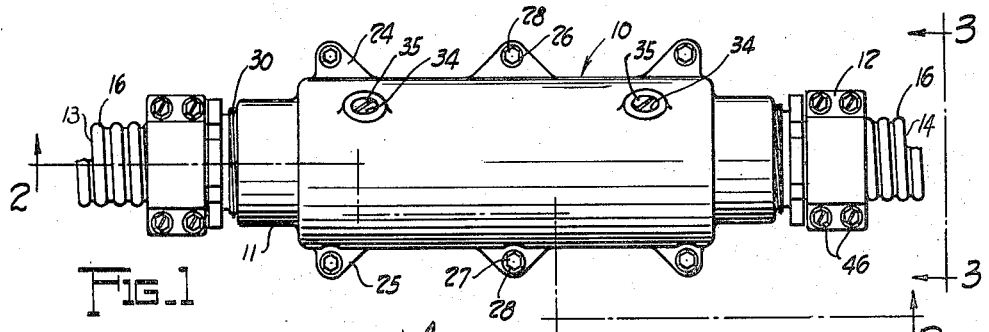
INVENTOR.
HENRY D. STECHER
BY Bosworth, Sessions,
Herrstrom & Lawler
ATTORNEYS

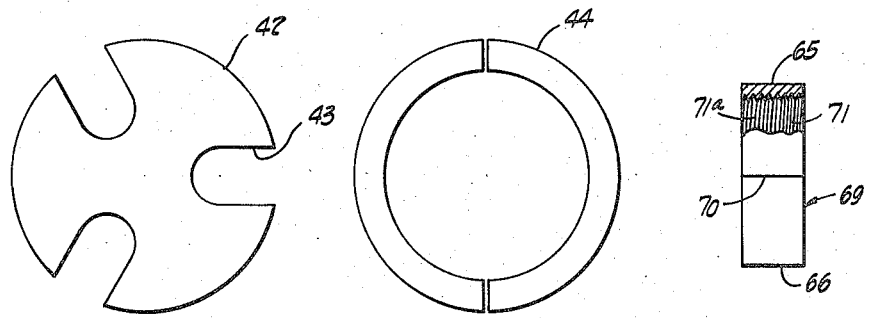
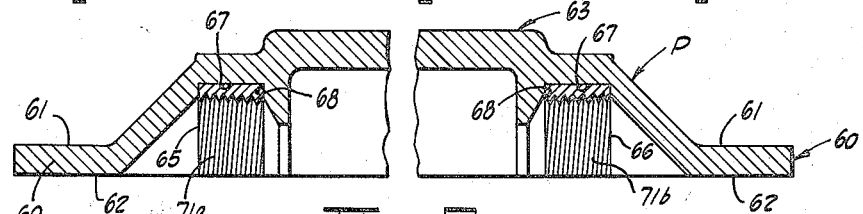
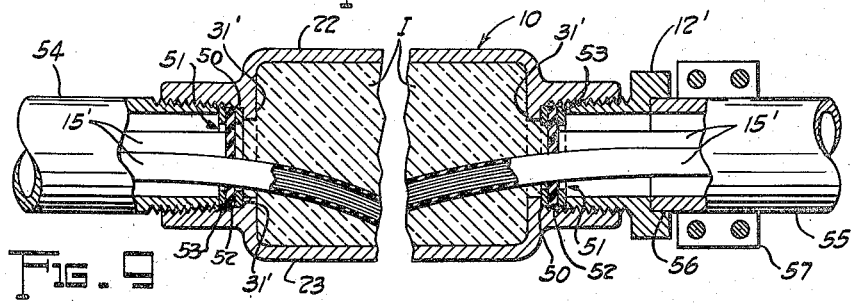
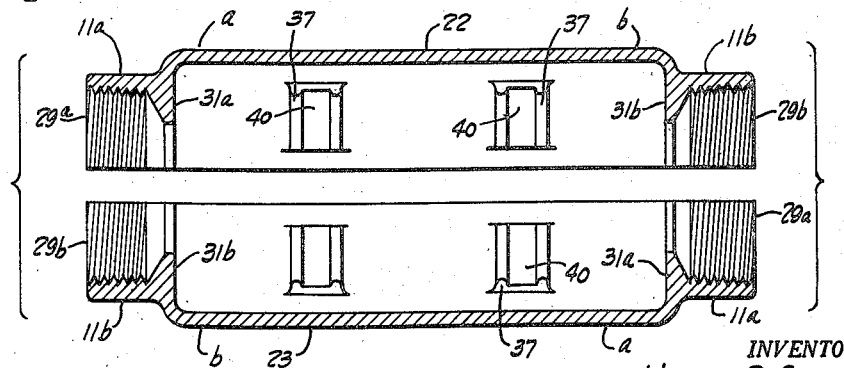

United States Patent Office 2,867,680
Patented Jan. 6, 1959

2,867,680

SPLICE BOX

Henry D. Stecher, Cleveland, Ohio

Application February 9, 1955, Serial No. 487,116

7 Claims. (Cl. 174—92)

This invention relates to cable splicing and more particularly to an improved splice box for joining multi-conductor electrical cables or conduits.

Prior commercial practice of splicing large multi-conductor cable in conduit or otherwise has been both tedious and expensive because of the endless taping involved in separating and covering the paired and joined ends of the individual conductors and in securing and protecting the assembly as a whole. I have simplified the splicing of such cable by providing a symmetrical splice box which spaces, insulates, secures and seals the conductor ends of respective cables without taping and which is economical to manufacture and easy to assemble.

A general object of my invention is the provision of an improved splice box and method of making same whereby a better, quicker, more economical and more secure splice of multi-conductor cable is obtainable. Another object is the provision of a multi-conductor cable splice box within which paired conductor ends of multi-conductor cables are joined and securely held in fixed spaced relationship and which completely protects the splices, the cable, and conductor. Another object is the provision of a splice box into which a sealing and insulating compound may be introduced and retained to completely surround and seal the joined ends of the conductors in the box. Still another object is the provision of a splice box made of identical half sections whereby to reduce cost and eliminate the problems of pairing and mating the box parts and of stocking unlike parts. Another object is the provision of a splice box having identical half sections so formed that proper relative alignment of the sections during assembly of the box is insured. A further object is the provision of a method of making a splice box having identical half sections with cast connector threads in each section, which threads are circumferentially aligned and matched when the sections are assembled.

These and other objects of my invention will become apparent from the following description of a preferred embodiment and practice thereof, reference being had to the accompanying drawings in which:

Figure 1 is a plan view of a splice box embodying my invention.

Figure 2 is an enlarged view of the splice box partially in elevation and partially in broken section, the view being taken along the line 2—2 of Figure 1; the insulating compound being broken away to show the conductors.

Figure 3 is an enlarged end view of the splice box taken along the line 3—3 of Figure 1.

Figure 4 is a transverse section of the splice box taken along the line 4—4 of Figure 2.

Figures 5 and 6 are elevations of conductor spacer and retainer elements, respectively, which constitute parts of the splice box assembly.

Figure 7 is a partially broken elevation of an internally threaded sleeve or nipple for making the threaded part of a pattern for casting a half of the splice box of my invention.

Figure 8 is a broken longitudinal section of an illustrative pattern for casting a half of my splice box.

Figure 9 is a broken longitudinal section showing a modified form of splice box of my invention adapted for use with rigid conduits.

Figure 10 is a longitudinal section of the two half sections of the splice box of Figures 1–4 in relative position to each other for assembly to make a complete box.

A preferred embodiment of my invention is illustrated in Figures 1–4 and 10 as a generally cylindrical open ended splice box 10 having internally threaded integral end collars 11 to which cable connectors 12 are secured for anchoring the ends of a pair of cables 13, 14 to the splice box. The cables may be of any commercial type and are illustrated and described herein as armor sheathed multi-conductor cables each having three insulated conductors 15 which extend beyond the armor 16. The armor and cable insulation 18 is cut back from the ends of the respective cable and the insulation at the end of each conductor 15 is stripped as at 17 and the exposed ends of the conductors secured in two-way cable connectors 19 by contact screws 20 or other suitable connectors not shown.

When the whole splice and connection has been completed the joined conductor ends 17 and connectors 19 are maintained in fixed radially spaced relation to each other within the box by insulating spacer and retaining elements 42 and 44, Figures 4, 5 and 6, and the whole box is filled with pourable insulating compound I, see fragment thereof in Figure 2, which is retained in the box by appropriate end seals 32—33, more fully described below. Provision is made for locating the spacers and permitting the insulating compound to flow throughout the box in the first instance so that the connected conductor ends and the whole lengths of the conductors within the box are spaced and fully insulated from each other and from the box and entirely protected from moisture and other foreign matter, and all possibility of electrical or mechanical contact with each other near their connected ends is eliminated.

In the following description, reference will first be made to my splice box and its constituent and components as the same are used to splice cables and conductors, Figures 1–6 and 10, and to splice conduits and conductors, Figure 9, and thereafter an illustrative method of making the identical halves of the box and making the box and splice therefrom and therewith will be described.

The splice box 10 comprises two identical substantially semi-cylindrical half sections 22 and 23, Figures 3, 4 and 10 each having a plurality of outwardly extending "long" lugs 24 and "short" lugs 25 on opposite sides thereof and drilled as indicated at 26 and 27, respectively, for receiving bolts and nuts 28 to hold the sections together. The necked extensions 11a and 11b at the ends of each half section are formed with internal cast half threads 29a, 29b, Figure 10. In the assembled splice box the mated extensions 11a and 11b form the end collars 11 and the half threads 29a and 29b are adapted to circumferentially align and form the cast collar threads 29 which are engaged by the threaded portions 30 of the cable connectors 12, Figure 2, to the end that the armor 16 and cables 13 and 14 may be securely joined to the splice box. The inner end of each collar 11 has an annular flange or abutment 31. A sealing ring 32 is squeezed against each flange 31 through washer 33 and seals each end of the splice box when the cable connectors 12 are tightened in the threads of the collars 11.

Drilled and tapped filler ports 34 closed by pipe plugs 35 are provided for filling the interior of the splice box with the compound I to insulate the connected ends of the conductors and to seal the splice within the splice box. I prefer that there be a port near each end of the splice box so that air within the box can be vented through one port as the compound is being poured into the box through the other.

Preferably longitudinally aligned ports are formed in opposite ends of each half section of the splice box and the uppermost pair of ports is utilized for filling purposes. The advantage of providing two ports in each half section is so that the half sections may be identical and the necessity of matching unlike upper and lower sections is eliminated. On the other hand the port openings may be drilled and tapped in only one of each pair of half sections with a saving in machining costs with a sacrifice pro tanto of complete identity, but without practical loss on any particular job where tapped and untapped sections are mated.

In order to space and support the conductors of each cable within the splice box, each half section 22 and 23 is formed with longitudinally and circumferentially spaced and circumferentially aligned internal bosses 37, Figures 2, 4 and 10. The bosses are equally spaced from the respective ends of each half section. Circumferentially aligned arcuate grooves 40 are formed in the longitudinally adjacent bosses. The grooves 40 are equidistant from the respective ends of each section and of smaller radius than the adjacent interior of the box. When the half sections of the splice box are assembled, as shown in Figures 2 and 4, the grooves 40 in adjacent sets of bosses in both sections are in circumferential alignment and stand inwardly from the interior surface of the box, Figures 2 and 4.

A disc-like conductor spacer element 42, see Figures 2, 4 and 5, having a plurality of equally spaced radial conductor receiving recesses 43 extending inwardly from the periphery thereof, is supported in the circumferentially aligned grooves 40 at each end of the splice box. The conductors 15, of the cables 13 and 14 extending inwardly from each end of the splice box, fit into and are bottomed in the recesses 43 of the spacer elements, see Figure 4, and are retained in that position by preferably split, retainer rings 44, Figures 4 and 6, disposed in the grooves 40 externally of the conductors and snugly filling the grooves adjacent the peripheries of the spacers 42. The spacers 42 space the conductors from each other and the retainers 44 space the conductors from the box. The spacers and rings are preferably made of fabric or fiber reinforced insulating resin materials. Each ring 44 is fitted around the conductors after they have been disposed in the radial recesses of the spacer element and thereby lock the several conductors in spaced relation when the half sections of the box are clamped together.

When using the above described splice box to splice multi-conductor cable, a suitable length of armor 16 and cable insulation 18 adjacent the ends of the respective cables 13 and 14 are removed and the insulation is removed from the ends of the several conductors 15. The cable connectors 12 with sealing washers and rings 33 and 32 are passed over the end of each cable and slipped back along the cable out of the way. The individual conductors of each cable are fitted in the recesses 43 of the respective spacer elements 42. The conductors of cable 13 are then paired or aligned with those of cable 14 and the exposed ends of the paired conductors are secured in the two-way connectors 19 by means of contact screws 20. Retainer rings 43 are then placed about the conductors 15 adjacent the spacer elements 42 and one of the half sections 23, for example, of the splice box is disposed under the paired and joined ends of the conductors. Each set of spacer elements and adjacent retainer rings is adjusted longitudinally on the conductors and placed in the corresponding aligned grooves 40 in the bosses 37. The other half section 22 is then placed upon, mated with and secured to the half section 23, care being exercised to seat the respective spacer elements 42 and retainer rings 44 in the respective aligned grooves 40 of the section 22. Sealing rings 32 and washers 33 are inserted in the collars 11 of the assembled box, and the threads 30 of cable connectors 12 are screwed into the threads of the collars 11, compressing the sealing rings 32 tightly against flanges 31. The connectors 12 are then tightened on the armor by means of screws 46 to firmly secure the cables to the box. The plugs 35 are then removed from two of the aligned filler holes or ports 34, the box being turned so that the open ports are uppermost. Insulating compound is then poured into one of the open holes, ports 34, flowing by gravity throughout the splice box and forcing the displaced air out of the other open port. Flow of the compound through the entire splice box is facilitated by the arcuate spacing 47, Figure 4, between the bosses 37 at each end of the splice box; the outside diameter of the spacers 42 and rings 44 and the inside diameter of the grooves 40 in the assembled box being less than the inside diameter of the box to provide the radial space 47 between the spacers and rings and the box.

To splice multi-conductor cables in conduit, Figure 9, my splice box may be in all respects the same as the preferred form described above. However in this instance I provide rubber sandwich seals 51, the inner rings 50 of which seat upon the flanges 31 to retain the sealing compound I within the splice box and without the conduits 54 and 55. The sandwich seals may be of conventional form having perforate rubber diaphragms 52 through which the conductors 15' snugly extend; the peripheries of the diaphragms being secured between said inner rings 50 and outer rings 53 and squeezed between the flange 31' and the threaded end of the conduit 54 as at the left end of the box, Figure 9, and between the flange 31' and the threaded end of the connector 12' at the other end of the box. The conductors 15' may be spaced and spliced within the box in the same way the conductors 15 are described to have been spaced and spliced above.

Assuming the ends of the conduits 54 and 55 are substantially fixedly spaced and located where the splice therebetween and between the conductors 15' is desired to be made, the utility of my splice box is such as to accommodate this result. The conductors 15' will have first been passed through the seals 51 and spliced and spaced, and the connector 12' loosely mounted on the end of the conduit 55. Then the seals 51 will be snugged up to contact with the ends of the conduit 54 and the end of the connector, the lower half 23 of the box brought up near the position shown in Figure 9, the seals 51 and spacers 42 and 44 oriented and aligned with the appropriate flanges, threads, bosses and grooves in the box half 23 and then the upper half 22 of the box assembled upon and oriented with the spacers, seals and threads substantially as shown in Figure 9. The two halves of the box may then be drawn together by the nuts and bolts 28 tightly enough to have workable threaded engagement between the female threads of the collars and the male threads of the conduit 54 and connector 12' without however having final tightness either on the threads or the spacers so that the box may be turned and screwed a fraction of a turn on the threads of the conduit 54 to lightly but sufficiently squeeze the left, as viewed, seal 51 adjacent the end of the conduit 54, and the connector 12' screwed a fraction of a turn into the collar at the other end of the box to similarly squeeze the other, right as viewed, seal 51. Thereafter the halves 22 and 23 of the box may be finally and tightly joined together by the clamp bolts and nuts 28 to fluid tight engagement with each other and for final tight threaded engagement with the conduit 54 and connector 12'.

It remains only to secure the end of the conduit 55 to the connector 12'; the extreme forward end of the conduit having been closely and freely entered in the rearwardly opening counterbore 56 of the annular forward and externally threaded part of the connector, and the adjacent forward part of the conduit lying freely within the rearward split clamping portions 57 of the connector. Clamping the portions 57 of the connector tightly upon the conduit 55 by bolts 46, see Figures 1 and 3, secures the conduit to the box through the connector, as shown in Figure 9.

Thereafter the box may be filled with pourable insulating compound I as described above; the seals 51 retaining the compound in the box and completing the splice according to my preferred teaching and practice.

The method and means by which I prefer to produce the identical half sections of and the hereinabove described splice box insure that the female collar threads 29 of the assembled box lie in continuous helices and are properly mated and properly and freely cooperative with the male threads of the connectors or conduits with which they have engagement. Reference is made to Figures 7 and 8 for illustration. In Figure 8 an integral metallic pattern and plate P comprises a flask closing marginal and peripheral plate portion 60 having planar parallel upper and lower faces 61 and 62 (except for a rib to provide a gate not shown) surrounding the pattern proper 63 corresponding to the splice box half to be sand cast acccording to known practice. That is to say, the exterior form of the casting of the box half rises convexly above the upper face 61 of the plate and the form of the interior of the casting rises concavely above the lower face 62 of the plate, see Figures 1-4 and 10 especially for the complementary particulars of the pattern not shown in Figure 8; the pattern necessarily reflecting the bosses, flanges, lugs, threads, etc. to be embodied in the casting. In the first instance I prefer that the pattern and plate be cast and/or formed without the semi-cylindrical threaded inserts 65 and 66, but having the semi-cylindrical surfaces 67 formed truly coaxial of the concave form of the pattern, the axis lying in the plane of the surface 62, and having the inwardly adjacent radial faces 68 equally spaced longitudinally from the middle of the pattern, and thus equally spaced from the nearer pair of bosses 37, cf. Figures 2 and 10. The surfaces 67 and 68 therefore locate the inserts 65 and 66 coaxially and symmetrically in the pattern.

The inserts 65 and 66, see Figure 7, are initially formed and/or tapped in the form of a continuous annulus, sleeve or nipple 69 which is diametrically split as at 70 so that when the inserts 65 and 66 are disposed as shown in Figure 7 the internal thread 71 tapped in both inserts will be truly helical and continuous. For example, the thread 71 could or theoretically should be tapped in the nipple 69 before splitting the nipple diametrically, and this illustrates the principle of symmetry and continuity of the half-threads 71a and 71b, first in the nipple 69 and then in the inserts 65 and 66 respectively, whereby corresponding cast half-threads 29a and 29b are formed in opposite ends of the each box half, see Figure 10, which when mated respectively with complementary half-threads in the collar extensions of a box half turned end for end as in Figure 10 will reproduce the continuous helical thread 71, allowance being made for shrinkage, in the complete threads 29 in the collars 11 at both ends of the assembled box, Figures 2 and 9.

In contemplation of casting the threads 29, I prefer to use a rounded cross-sectional thread form, not attempted to be specifically illustrated in the drawings, and the thread as tapped in the insert nipple 69 and reproduced in the threads 29 of the collars may be tapered or straight threads as requirements may dictate.

For convenience of illustration in Figure 10 the left end of the upper box half 22 with the collar extension 11a and half-threads 29a has been designated "a" and the right end designated "b." To show the end-for-endness of the lower box half 23 with respect to the upper box half 22 the "a" end of the lower box half is juxtaposed to the "b" end of the upper box half and the "b" end of the lower juxtaposed to the "a" end of the upper.

To insure that the half sections 22, 23 are correctly assembled in the relative positions described above, the lugs 24, Figures 1, 3 and 4, are formed to extend radially outwardly from the wall of the box a greater distance from the lugs 25, and the holes 26 in lugs 24 are drilled on centers radially spaced a greater distance from the longitudinal axis of the half-box, than the centers of holes 27 in lugs 25. That is to say, the radial distance X, Figure 4, of holes 26 from the axis is greater than the corresponding radial distance Y of holes 27 from the axis. In order to fit the half-sections 22, 23 together with the semi-circular portions of the box halves forming true circles with each other and with the bolt holes aligned to receive bolts 28, see Figure 4, the two half-sections must be mated so that lugs 24 on one section are juxtaposed to the lugs 24 on the other section. When the half-sections are assembled in this manner, the "a" portion of one section is matched with the "b" portion of the other, and complementary end threads 29a, 29b are matched at each end of the assembled splice box to provide a continuous thread 29 in the collars 11 at each end of the splice box. By the same token the bosses 37 and grooves 40 became properly spaced and aligned in the assembled box and the half flanges 31a match the equal and opposite juxtaposed half flanges 31b to form the complete sealing flanges 31 in the assembled box.

The primary assurance that the end-for-end assembly of the box halves brings the perfect fit of the parts proceeds from the accurate making of the plate-pattern P with the inserts 65 and 66 spaced and located equally with respect to the parts of the pattern defining the adjacent bosses and flanges and the lugs 24 and 25. As a final precaution I prefer to drill the holes 26 and 27 in the lugs 24 and 25 when a pair of box halves 22 and 23, related end for end as shown in Figure 10, are gripped or held together with male threaded plugs, not shown, or connectors 12 for instance, in full threaded engagement with the threads 29 and with provision that the holes 26 and 27 be drilled with equal longitudinal symmetry with respect to the box and the threads, bosses and flanges of both halves thereof. In this way each finished half-box will mate correctly and desirably with all other half-boxes similarly and equally formed.

While I have illustrated and described preferred forms and embodiments of my invention, including a desirable method and means of making embodiments thereof, modifications, improvements and changes therein and thereto may occur to those skilled in the art without departing from the teachings of this specification or the precepts and principles of my invention. Therefore, I do not with to be limited in the scope of my patent to the specific forms, methods and embodiments herein illustrated and described, nor in any manner inconsistent with the progress in the art promoted by my invention.

I claim:

1. A multi-conductor splice box having interiorly threaded openings at the ends and comprising substantially identical longitudinally divided half-sections detachably secured together, connector means disposed within said box separately joining paired conductors, means within the box for supporting and spacing said conductors and connectors including longitudinally spaced sets of arcuately spaced internal bosses having inwardly opening circumferentially aligned arcuate grooves, said grooves in said sets of bosses being equidistantly spaced from the respective ends of said box and including spacer elements for the conductors having a plurality of angularly spaced radial slots each receptive of a conductor and extending inwardly from the periphery thereof and spacing said conductors and connectors from each other and including a ring element adjacent each said spacer element and circumscribing the conductors when the conductors are bottomed in the respective slots of the spacer elements and spacing said conductors and connectors from the interior of said box, said spacer and adjacent ring elements having substantially equal outside diameters, each said spacer and adjacent ring element being adapted to have their peripheral edges fit into and seat in the grooves of one set of bosses, means for detachably securing said half-sections together, and connector means threadably engaged in said end openings.

2. The splice box according to claim 1, with an inwardly extending annular flange adjacent the inward end of the threads at each end of said box, and sealing means sealing the ends of said box, said sealing means being compressed between each said flange and adjacent connector means.

3. A splice box for joining and splicing paired conductors comprising identical longitudinally divided half-sections detachably secured together, connector means within said box separately joining paired conductors, means within the box for supporting and spacing said conductors and connectors including longitudinally spaced sets of arcuately spaced internal bosses having inwardly opening circumferentially aligned arcuate grooves, said grooves in said sets of boss being equidistantly spaced from the respective ends of said box, and including a spacer element for the conductors having a plurality of angularly spaced radial slots each receptive of a conductor and extending inwardly from the periphery thereof and spacing said conductors and connectors from each other, and including a ring element adjacent each said spacer element and circumscribing the conductors when the conductors are bottomed in the respective slots of the spacer elements and spacing said conductors and connectors from the interior of said box, said spacer and ring elements having substantially equal outside diameters, each said spacer and adjacent ring element being adapted to have their peripheral edges fit into and set in the grooves of one set of bosses, and means of detachably securing said half-sections together.

4. A cable splice box for joining and splicing paired conductors of multi-conductor cables with end openings for the cables and with interior space for the paired conductors in spaced relation from each other and from the interior of the box, said box comprising longitudinally divided half-sections secured together, arcuately spaced and circumferentially aligned internal bosses in said sections, a spacer element for said paired conductors having radial slots, each receptive of a conductor and spacing said conductors from each other, a spacer ring surrounding said conductors and retaining them in said slots, said spacer element and said spacer ring being engaged and supported by said bosses to space the conductors from the box.

5. A cable splice box for splicing a pair of multi-conductor cables, said box having identically threaded open ends through which the cables enter the box, said box comprising longitudinally divided identical half-sections, said half-sections each being longitudinally symmetrical except for said threads, each said half-section having longitudinally spaced apertured lugs extending outwardly from the longitudinal side edges of the said section, the apertures of the lugs on each side edge being longitudinally aligned and the apertures on one side being spaced a greater distance from the longitudinal axis of the half-section than the apertures on the other side thereof, said half-sections being mated with correspondingly spaced apertures adjacent and aligned, and fastening means in said aligned apertures securing said half-sections together.

6. A hollow splice box for joining and splicing paired conductors of multi-conductor cables, said box defining a space for pourable insulating compound and having openings through which the cables enter the box, and comprising divided half-sections detachably secured together, connector means disposed within said box for joining the paired conductors, longitudinally spaced sets of arcuately spaced bosses on the internal wall of said box, inwardly opening circumferentially aligned grooves in said bosses and having a radius less than the radius of the adjacent internal wall portions of the box, and spacer elements each having a plurality of apertures extending inwardly from its periphery for receiving, spacing and supporting the conductors and being peripherally seated in the grooves of one set of bosses and radially spaced from the internal wall of said box between arcuately adjacent bosses to facilitate the flow of insulating compound when said compound is poured into said box.

7. A cable splice box for splicing a pair of multi-conductor cables, said box having identically threaded open ends through which the cables enter the box, said box comprising longitudinally divided identical half-sections assembled in end for end relationship, each said half-section having half-threads in one end complementary to the half-threads in the other end and also having registration means, said registration means in each said half-section being adapted to register with the same means in the other said half-section in the assembled box only when said half-sections are assembled in said end for end relationship and the threads in said open ends of said box are functionally aligned.

References Cited in the file of this patent
UNITED STATES PATENTS

| | | |
|---|---|---|
| 296,185 | Kruesi | Apr. 1, 1884 |
| 508,613 | Henry | Nov. 14, 1893 |
| 707,055 | Earl | Aug. 12, 1902 |
| 1,650,233 | Plunkett | Nov. 22, 1927 |
| 2,210,400 | Fischer et al. | Aug. 6, 1940 |

FOREIGN PATENTS

| | | |
|---|---|---|
| 21,646 | Great Britain | Sept. 25, 1913 |
| 810,038 | Germany | Aug. 6, 1951 |